UNITED STATES PATENT OFFICE.

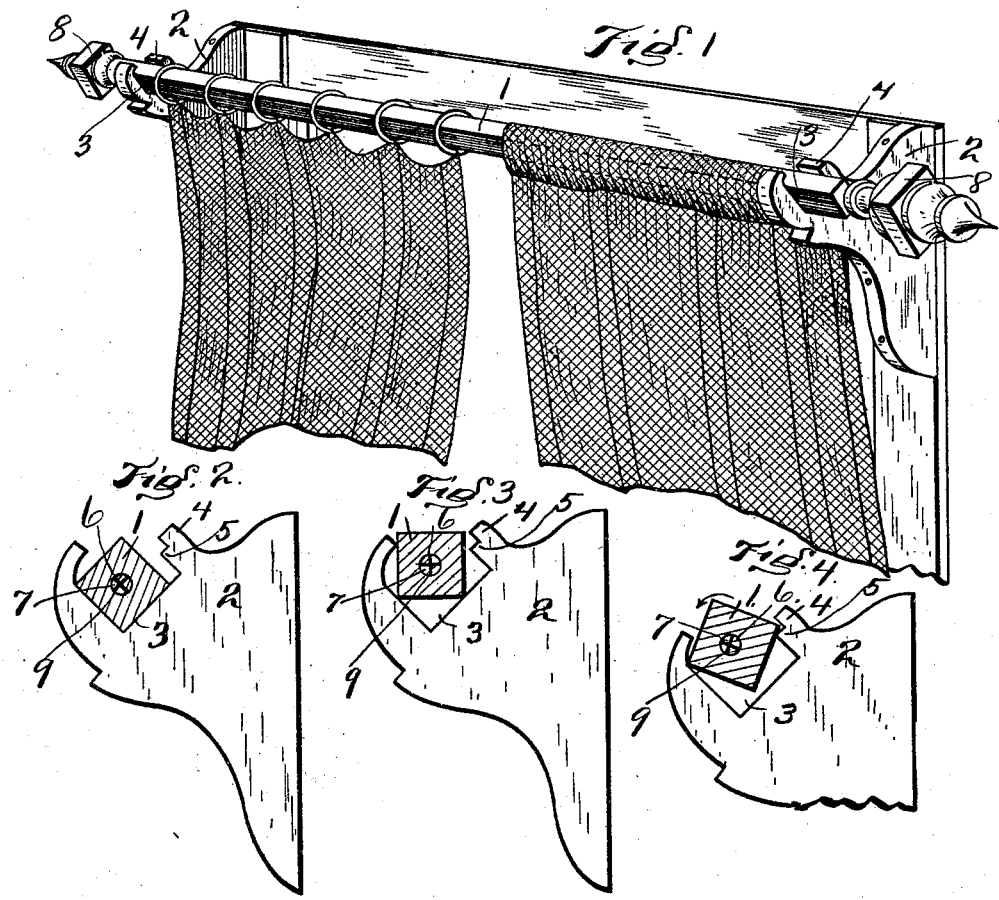

THOMAS B. BAKER, OF BOLIVAR, OHIO.

CURTAIN POLE AND FIXTURE.

SPECIFICATION forming part of Letters Patent No. 673,412, dated May 7, 1901.

Application filed June 13, 1900. Serial No. 20,126. (No model.)

*To all whom it may concern:*

Be it known that I, THOMAS B. BAKER, a citizen of the United States, residing at Bolivar, in the county of Tuscarawas and State of Ohio, have invented certain new and useful Improvements in Curtain Poles and Fixtures; and I do hereby declare that the following is a full, clear, and exact description of the same, reference being had to the annexed drawings, making a part of this specification, and to the figures of reference marked thereon, in which—

Figure 1 is a perspective view showing the pole properly connected to brackets and illustrating curtains connected thereto. Fig. 2 is a side view of one of the brackets, showing a transverse section of the pole and illustrating the pole properly seated in the bracket-notch. Fig. 3 is a side elevation of a bracket, showing the pole dropped into the bracket-notch and illustrating its position before it is seated or brought into its normal position. Fig. 4 is a similar view showing the pole turned to be normally seated.

The present invention has relation to curtain poles and fixtures; and it consists in the novel arrangement hereinafter described, and particularly pointed out in the claim.

Similar numerals of reference indicate corresponding parts in all the figures of the drawings.

In the accompanying drawings, 1 represents the curtain-pole proper, which is formed angular in cross-section and is so formed for the purpose of preventing any rotation of the pole after it has been brought into its normal position and at the same time giving a pleasing appearance to the pole.

The brackets 2 may be substantially of the form shown and are connected to the window-casing in any convenient and well-known manner. The brackets 2 are each provided with the angular recess 3, which angular recess corresponds substantially with the angularity of the curtain-pole 1, so that when the pole 1 is brought into its normal position two faces of the pole will rest or bear against two edges of the recess 3, as illustrated in Fig. 2, thereby preventing any rotation of the pole.

In attaching or connecting the pole 1 to the brackets 2 the pole is dropped into the recess 3, as illustrated in Fig. 3, after which the pole is turned into the position illustrated in Fig. 4, after which it can be brought into the position illustrated in Fig. 2, which is its normal position.

For the purpose of preventing any accidental displacement of the pole 1 after it has been brought into its normal position the brackets 2 are provided with the projections 4, which projections are located substantially as shown in Figs. 2, 3, and 4.

It will be understood that in order to remove the pole it must be turned into a position to clear the shoulders 5.

It will be understood that by forming the pole 1 angular in cross-section the grain of wood can be better illustrated or shown, thereby giving a pleasing appearance to the pole.

Another advantage in forming the pole angular in cross-section is that the pole will not be so liable to sag or spring, and if in the event it would sag or spring it can be removed from the bracket-notches and turned so as to bring the convexed side up and again connected to the brackets.

It will be understood that the object of the present invention can be carried out without any specific reference to the form of the brackets except as to their recesses.

In order to place the pole 1 in position illustrated in Fig. 2, it should be rotated in the direction of the arrow, Fig. 4, thereby allowing the pole to assume the position shown in said Fig. 2.

The projection 4 will prevent the pole from becoming accidentally detached, inasmuch as the pole will necessarily have to be rotated or rocked in order to remove the same.

It is immaterial as to the manner of attaching the curtains to the pole, as various ways may be employed, and I have illustrated two ways of connecting the curtains proper to the pole.

The curved projection and the projection 4 converge toward each other, thus providing a contracted mouth to the recess. These projections form such a narrow mouth that the pole could not be inserted were the shoulder or notch 5 not provided in the part 4; but by the provision of this notch 5 and by placing one edge of the pole therein and then by turning or rotating the pole it may be seated in the recess 3.

Having fully described my invention, what I claim as new, and desire to secure by Letters Patent, is—

In a curtain-pole fixture, the combination of a pole formed angular in cross-section and provided with knobs, brackets provided with the recesses 3, projections converging toward each other, and over the recesses 3, and the notches 5, substantially as and for the purpose set forth.

In testimony that I claim the above I have hereunto subscribed my name in the presence of two witnesses.

THOMAS B. BAKER.

Witnesses:
J. A. JEFFERS,
F. W. BOND.